(12) United States Patent
Hantschel et al.

(10) Patent No.: US 12,021,211 B2
(45) Date of Patent: Jun. 25, 2024

(54) BATTERY STORAGE DEVICE, VEHICLE, AND METHOD FOR PRODUCING A BATTERY STORAGE DEVICE

(71) Applicant: ElringKlinger AG, Dettingen (DE)

(72) Inventors: Jochen Hantschel, Dettingen a.d.Erms (DE); Tobias Schmidt, Pliezhausen (DE)

(73) Assignee: ElringKlinger AG, Dettingen (DE)

( * ) Notice: Subject to any disclaimer, the term of this patent is extended or adjusted under 35 U.S.C. 154(b) by 490 days.

(21) Appl. No.: 17/350,986

(22) Filed: Jun. 17, 2021

(65) Prior Publication Data

US 2021/0313638 A1 Oct. 7, 2021

Related U.S. Application Data

(63) Continuation of application No. PCT/EP2019/085443, filed on Dec. 16, 2019.

(30) Foreign Application Priority Data

Dec. 21, 2018 (DE) ..................... 10 2018 222 896.5

(51) Int. Cl.
*H01M 10/6556* (2014.01)
*H01M 10/625* (2014.01)
(Continued)

(52) U.S. Cl.
CPC ..... *H01M 10/6556* (2015.04); *H01M 10/625* (2015.04); *H01M 10/647* (2015.04);
(Continued)

(58) Field of Classification Search
CPC .......... H01M 10/0525; H01M 10/625; H01M 10/647; H01M 10/6554; H01M 10/6556;
(Continued)

(56) References Cited

U.S. PATENT DOCUMENTS

2009/0075158 A1 3/2009 Rudorff et al.
2009/0325051 A1 12/2009 Niedzwiecki et al.
(Continued)

FOREIGN PATENT DOCUMENTS

DE 10 2012 205 750 A1 10/2013
DE 10 2012 216 916 A1 3/2014
(Continued)

*Primary Examiner* — Victoria H Lynch
(74) *Attorney, Agent, or Firm* — ASLAN LAW, P.C.

(57) ABSTRACT

A battery storage device, in particular a battery storage device for a vehicle, said storage device being simple and in particular inexpensive to produce and allowing a reliable seal. This is achieved in that the battery storage device comprises the following: a battery storage housing that encloses an interior in which one or more battery modules are received or can be received; and one or more temperature-controlling elements through which a temperature-controlling medium can flow in order to control the temperature of one or more battery modules which are received or can be received in the interior of the battery storage housing, wherein the one or more temperature-controlling elements comprise a temperature-controlling medium inflow connection and a temperature-controlling medium discharge connection which are arranged outside of the interior of the battery storage housing, and the one or more temperature-controlling elements are produced by roll bonding in particular.

17 Claims, 15 Drawing Sheets

(51) Int. Cl.
*H01M 10/647* (2014.01)
*H01M 10/6554* (2014.01)
*H01M 50/204* (2021.01)
*H01M 50/209* (2021.01)
*H01M 50/224* (2021.01)
*H01M 50/249* (2021.01)
*H01M 50/271* (2021.01)
*H01M 50/289* (2021.01)

(52) U.S. Cl.
CPC ..... *H01M 10/6554* (2015.04); *H01M 50/204* (2021.01); *H01M 50/209* (2021.01); *H01M 50/224* (2021.01); *H01M 50/249* (2021.01); *H01M 50/271* (2021.01); *H01M 50/289* (2021.01); *H01M 2220/20* (2013.01)

(58) Field of Classification Search
CPC ........... H01M 2220/20; H01M 50/204; H01M 50/209; H01M 50/224; H01M 50/249; H01M 50/271; H01M 50/289; Y02E 60/10

See application file for complete search history.

(56) References Cited

U.S. PATENT DOCUMENTS

| | | |
|---|---|---|
| 2015/0086831 A1 | 3/2015 | Haussmann |
| 2015/0144314 A1 | 5/2015 | Srinivassan et al. |
| 2018/0062226 A1 | 3/2018 | Raiser et al. |
| 2020/0091573 A1 | 3/2020 | Einoegg et al. |

FOREIGN PATENT DOCUMENTS

| | | |
|---|---|---|
| DE | 10 2014 223 207 A1 | 5/2015 |
| DE | 10 2016 009 969 A1 | 2/2017 |
| DE | 10 2017 208 617 A1 | 11/2018 |

BATTERY STORAGE DEVICE, VEHICLE, AND METHOD FOR PRODUCING A BATTERY STORAGE DEVICE

RELATED APPLICATION

This application is a continuation of international application No. PCT/EP2019/085443 filed on Dec. 16, 2019, and claims the benefit of German application No. 10 2018 222 896.5 filed on Dec. 21, 2018, which are incorporated herein by reference in their entirety and for all purposes.

FIELD OF DISCLOSURE

The present invention relates to a battery storage device, in particular to a battery storage device for a vehicle.

BACKGROUND

Battery storage devices, in particular for vehicles, often require temperature-control elements for the temperature-control of the battery modules and/or battery cells of the battery storage device. On the one hand, it may be necessary to cool the battery modules and/or battery cells by means of the temperature-control elements; on the other hand, it may be required to heat the battery modules and/or battery cells by means of the temperature-control elements. It is known in this context for the battery cells to be embedded in a nonconducting temperature-control liquid and hence to be temperature-controlled by means of the temperature-control liquid. Moreover, it is known for battery cells to be cooled by means of temperature-control elements which comprise a temperature-control channel structure through which a temperature-control medium is channeled for the temperature-control of the battery cells. Here, the battery cells are intended in particular not to come into direct contact with the temperature-control medium, in particular with a temperature-control liquid. However, what results here are problems in the region of the temperature-control medium supply and of the temperature-control medium discharge.

SUMMARY OF THE INVENTION

The object on which the present invention is based is that of providing a battery storage device which can be produced in a simple and, in particular, cost-effective manner and which allows reliable sealing.

This object is achieved according to the invention by means of a battery storage device, in particular a battery storage device for a vehicle, having the features of claim 1.

The battery storage device preferably comprises the following:
- a battery storage housing which encloses an interior in which one or more battery modules is/are received or can be received;
- one or more temperature-control elements through which a temperature-control medium can flow and which are intended for the temperature-control of one or more battery modules which is/are received or can be received in the interior of the battery storage housing,
- wherein the one or more temperature-control elements comprise a temperature-control medium supply connection and a temperature-control medium discharge connection which are arranged outside of the interior of the battery storage housing.

Preferably, the temperature-control elements are produced by means of roll bonding.

In one embodiment of the battery storage device, there is provision that the one or more temperature-control elements each comprise one or more, in particular in each case two, connection stubs, wherein the connection stubs preferably project away from a temperature-control element basic body of the temperature-control element transversely, in particular at least approximately perpendicularly, to a main plane of extent of a temperature-control element.

The battery storage device preferably further comprises one or more covering elements for sealing the temperature-control medium supply connection and/or the temperature-control medium discharge connection of a respective temperature-control element.

A battery module of the battery storage device preferably comprises one or more battery cells.

One or more temperature-control elements preferably serves/serve for the temperature-control, in particular for the cooling and/or heating, of one or more battery modules.

The one or more temperature-control elements preferably comprise a temperature-control channel structure through which a temperature-control medium, in particular a temperature-control liquid, can be channeled.

The temperature-control liquid which can be used is, for example, water or a water-glycol mixture.

Temperature-control medium can preferably be supplied to the temperature-control channel structure by means of the temperature-control medium supply connection.

Temperature-control medium can preferably be discharged from the temperature-control channel structure by means of the temperature-control medium discharge connection.

In particular, a plurality of rows of battery modules are arranged in the interior of the battery storage housing.

The covering element is in particular a plastics component.

Reliable sealing of the interior of the battery storage housing can preferably be made possible by means of the one or more covering elements.

In one embodiment of the battery storage device, there is provision that the one or more temperature-control elements each comprise a connection portion on which the temperature-control medium supply connection and/or the temperature-control medium discharge connection are/is arranged, wherein the connection portion of the one or more temperature-control elements is in each case substantially arranged outside of the interior of the battery storage housing and is preferably in each case covered by means of a covering element.

The one or more temperature-control elements are preferably only partially arranged within the interior of the battery storage housing.

A temperature-control element preferably further comprises a temperature-control portion by means of which battery modules of the battery storage device can be temperature-controlled.

It may be favorable if at least approximately 90%, preferably at least approximately 95%, of a temperature-control channel structure of the temperature-control element is arranged within the temperature-control portion.

A connection portion of a temperature-control element preferably has a smaller width than a temperature-control portion of the temperature-control element.

Preferably, a width of the connection portion of the temperature-control element is at least approximately 30%, in particular at least approximately 40%, preferably at least approximately 50%, smaller than a width of the temperature-control portion of the temperature-control element.

It may be favorable if the temperature-control element comprises a tongue portion which forms the connection portion.

Preferably, only the connection portion of the temperature-control element is arranged substantially outside of the interior of the battery storage housing.

The connection portion and the temperature-control portion of a temperature-control element are preferably connected to one another by means of a transition portion in which a width of the temperature-control element increases.

In one embodiment of the battery storage device, there is provision that the one or more temperature-control elements each comprise one or more, in particular in each case two, connection stubs, wherein the one or more covering elements are each connected by a substance-to-substance bond, in particular adhesively bonded, to one or more connection stubs at one or more connection sealing regions.

Preferably, a covering element in each case comprises one or more through-guiding openings through each of which one or more connection stubs of a temperature-control element are guided.

If a covering element comprises only one through-guiding opening and two connection stubs are guided through the through-guiding opening, the through-guiding opening preferably takes the form of an elongate hole.

As an alternative thereto, it is conceivable for the covering element to comprise two, in particular circular through-guiding openings, wherein in each case a connection stub is guided through a through-guiding opening.

A covering element is preferably in each case connected by a substance-to-substance bond, in particular in an adhesively bonded manner, to a collar portion of a connection stub.

A connection sealing region is preferably closed in the form of a ring.

It may be favorable if a through-guiding opening is surrounded by the connection sealing region so as to be closed in the form of a ring.

A collar portion is preferably connected by a substance-to-substance bond, in particular welded, to a temperature-control element basic body.

As an alternative to a collar portion, it is conceivable for two connection stubs to comprise a common collar plate which is preferably connected by a substance-to-substance bond, in particular welded, to a temperature-control element basic body.

It may therefore also be favorable if a covering element is in each case connected by a substance-to-substance bond, in particular adhesively bonded manner, to a common collar plate of two connection stubs.

The one or more connection stubs are preferably each connected by a substance-to-substance bond, in particular in a welded manner, to a temperature-control element.

A temperature-control element preferably in each case comprises two connection stubs, in particular an inlet connection stub and/or an outlet connection stub.

An inlet connection stub forms in particular a temperature-control medium supply connection.

An outlet connection stub forms in particular a temperature-control medium discharge connection.

The connection stubs preferably project away from the temperature-control element basic body transversely in particular at least approximately perpendicularly, to a main plane of extent of a temperature-control element.

The one or more temperature-control elements are preferably able to be connected by means of the connection stubs to a temperature-control medium supply line and/or to a temperature-control medium discharge line.

In one embodiment of the battery storage device, there is provision that the one or more covering elements are each connected by a substance-to-substance bond, in particular in an adhesively bonded manner, to the battery storage housing at a housing sealing region.

It may be favorable if the one or more covering elements are connected by a substance-to-substance bond, in particular in an adhesively bonded manner, to a bottom wall element of the battery storage housing and/or to a side wall element of the battery storage housing.

The one or more covering elements are preferably connected by a substance-to-substance bond to the side wall element, in particular to a frame element of the battery storage housing.

The one or more covering elements are preferably further connected by a substance-to-substance bond to a weld seam which connects the bottom wall element to the side wall element, in particular to the frame element.

It may be favorable if the covering element is adhesively bonded to the weld seam which connects the bottom wall element to the side wall element, in particular to the frame element.

In one embodiment of the battery storage device, there is provision that the one or more covering elements each comprise, in the connection sealing region and/or in the housing sealing region, an adhesive groove for receiving an adhesive material, and a bearing region which bears against the battery storage housing and/or against a temperature-control element.

The adhesive groove is preferably closed peripherally and/or in the form of a ring.

It may be favorable if the adhesive groove has a width in the range from 2 mm to 10 mm, preferably in the range from 4 to 8 mm.

It may further be favorable if the adhesive groove has a depth in the range from 0.05 mm to 0.5 mm, for example of approximately 0.15 mm.

The bearing region of a covering element in the one or more connection sealing regions preferably bears against a collar portion of a connection stub or against a common collar plate of two connection stubs of a temperature-control element.

The bearing region of a covering element in the housing sealing region bears in particular against a bottom wall element and/or against a side wall element of the battery storage housing.

In one embodiment of the battery storage housing, there is provision that the one or more covering elements are connected to a bottom wall element of the battery storage housing in a positively-locking and/or force-locking manner.

The bottom wall element preferably comprises one or more latching cutouts for receiving latching projections.

It may be favorable if a covering element comprises one or more latching projections which is/are received or can be received in latching cutouts of the bottom wall element.

In one embodiment of the battery storage device, there is provision that the battery storage housing comprises a plurality of guide elements for guiding a temperature-control element in a guiding direction.

Preferably, the guide elements each comprise a guide surface which is oriented parallel to the guiding direction.

It may be favorable if a temperature-control element is guided, in a temperature-control portion of the temperature-control element, by means of guide elements situated opposite one another transversely with respect to the guiding direction.

In particular, it is conceivable for the battery storage housing to comprise two or more than two guide elements which are arranged mirror-symmetrically to a plane of symmetry of a temperature-control element.

The guide elements are preferably fixed on a bottom wall element of the battery storage housing, in particular in a positively-locking and/or force-locking manner or by means of a substance-to-substance bond.

The guide elements are, for example, screwed, clipped and/or welded to the bottom wall element.

One or more battery modules of the battery storage device preferably in each case abut on a plurality of guide elements which are in particular arranged so as to be opposite to one another transversely with respect to a guiding direction.

One or more battery modules particularly abut in each case directly on a plurality of guide elements.

In one embodiment of the battery storage device, there is provision that a side wall element of the battery storage housing comprises one or more through-passage openings, wherein one or more temperature-control elements are in each case at least partially guided through the one or more through-passage openings.

A temperature-control element is in particular guided along a through-guiding direction through a through-passage opening in a side wall element of the battery storage housing.

Preferably, a side wall element comprises two through-passage openings through each of which a temperature-control element is at least partially guided.

In particular, a connection portion of the temperature-control element is guided through the through-passage opening.

Preferably, a width of the through-passage opening in the side wall element of the battery storage housing corresponds at least approximately to a width of the connection portion of the temperature-control element.

A width of the through-passage opening in the side wall element of the battery storage housing is preferably at most approximately 20%, in particular at most approximately 10%, preferably at most approximately 5%, larger than a width of the connection portion of the temperature-control element.

A width of the connection portion is in particular a width taken in a main direction of extent.

A height of the through-passage opening in the side wall element of the battery storage housing preferably corresponds at least to a height of a temperature-control element.

A height of the through-passage opening in the side wall element of the battery storage housing is preferably at most approximately 20%, in particular at most approximately 10%, preferably at most approximately 5%, larger than a height of the temperature-control element.

A height of the temperature-control element is preferably a height taken in a thickness direction of the temperature-control element and/or perpendicularly to a main direction of extent of the temperature-control element.

In one embodiment of the battery storage device, there is provision that the battery storage housing comprises one or more stop elements by means of which any displacement of a temperature-control element in a guiding direction relative to the battery storage housing is limited or can be limited.

A guiding direction is preferably parallel to a through-guiding direction along which the temperature-control element is guided through a through-passage opening in a side wall element of the battery storage housing.

Preferably, the battery storage housing for each temperature-control element in each case comprises two or more than two stop elements.

In order to limit and/or prevent any displacement of a temperature-control element in a crash situation in the guiding direction relative to the battery storage housing, there can be provision that a temperature-control element is fixed on the battery storage housing in the guiding direction by means of a plurality of stop elements which are arranged at end regions of the temperature-control element that face away from one another in the guiding direction.

Alternatively or additionally, it is conceivable for the battery storage device to comprise one or more bolt elements which are fixed on the bottom wall element and which are each in particular guided through a through-passage opening in a temperature-control element. It is possible by means of such bolt elements for a temperature-control element preferably to be able to be fixed on the battery storage housing in the guiding direction. The bolt elements and/or the through-passage openings are preferably arranged on a connection portion and/or on a transition portion of a temperature-control element.

It may be favorable if the stop elements are arranged and/or formed so as to be at least approximately mirror-symmetrical, in particular at least approximately mirror-symmetrical to a plane of symmetry of a temperature-control element.

Preferably, one or more, in particular in each case two, stop elements of the battery storage housing, for the purpose of limiting any displacement of the temperature-control element, bear or can be made to bear against a temperature-control element, in particular a transition portion of the temperature-control element.

The stop elements are preferably fixed on a bottom wall element of the battery storage housing, in particular in a positively-locking and/or force-locking manner and/or by a substance-to-substance bond.

The stop elements are, for example, screwed, clipped and/or welded to the bottom wall element.

Preferably, the one or more stop elements and a temperature-control element each comprise stop surfaces of complementary form by means of which the temperature-control element can abut against one or more stop elements.

In one embodiment of the battery storage device, there is provision that the one or more covering elements each comprise two or more than two latching receptacles on each of which a latching element is fixed or can be fixed in a latchable or clippable manner.

In particular, a temperature-control medium supply line and/or a temperature-control medium discharge line are/is fixed or can be fixed on a covering element by means of a respective latching receptacle.

In particular, cable tie eyes for fastening a temperature-control medium supply line and/or a temperature-control medium discharge line can be fixed on the latching receptacles.

The one or more covering elements preferably comprise a total of four latching receptacles on which there can be alternately fixed in particular two latching elements.

Preferably, the battery storage device comprises two identical covering elements.

Temperature-control medium supply lines and/or temperature-control medium discharge lines are preferably fixed or can be fixed in a mirror-inverted manner on a covering element by means of the four latching receptacles.

The one or more covering elements preferably comprise a marking, in particular a written indication of the temperature-control medium supply connection and/or of the temperature-control medium discharge connection.

In one embodiment of the battery storage device, there is provision that the battery storage housing comprises the following:
- a bottom wall element; and/or
- one or more partition wall elements; and/or
- a plurality of, in particular four, side wall elements; and/or
- a cover element.

The side wall elements and the bottom wall element preferably surround an interior of the battery storage housing on five sides.

Preferably, the bottom wall element and two or more than two side wall elements take the form of a one-piece bent sheet-metal part.

The interior of the battery storage housing is preferably further able to be covered by means of the cover element.

The side wall elements and the bottom wall element preferably form a housing basic body of the battery storage housing.

The housing basic body is preferably formed in one piece.

For example, it is conceivable for the side wall elements to be connected by a substance-to-substance bond, in particular in a welded manner, to the bottom wall element.

Preferably, the battery storage housing comprises a frame element which is connected by a substance-to-substance bond, in particular in a welded manner, to the bottom wall element.

The side wall elements are preferably connected by a substance-to-substance bond, in particular in a welded manner, to the same adjoining side wall elements.

The bottom wall element preferably projects, in a main direction of extent of the bottom wall element, over and beyond one or more side wall elements, in particular beyond the frame element, of the battery storage housing.

The frame element preferably comprises a plurality of, in particular four, side wall elements and one or more partition wall elements.

A plurality of partition wall elements of the frame element are preferably arranged so as to be at least approximately parallel to one another and/or connect two side wall elements which are situated opposite to one another in each case.

Preferably, a partition wall element is in each case welded to side wall elements which are situated opposite to one another.

It may be favorable if side wall elements which are situated opposite to one another in each case are arranged parallel to one another.

Mutually adjoining side wall elements are preferably arranged perpendicularly to one another.

In one embodiment of the battery storage device, there is provision that the one or more temperature-control elements in each case comprise a temperature-control element basic body which is constructed in particular so as to be at least approximately mirror-symmetrical.

It may be favorable if a temperature-control element basic body of a temperature-control element comprises two metallic components which are connected to one another by a substance-to-substance bond at least in certain regions, in particular only in certain regions.

The two metallic components of the temperature-control element basic body preferably delimit a temperature-control channel structure of a temperature-control element.

Preferably, the two metallic components of the temperature-control element basic body are connected to one another by means of roll bonding.

The temperature-control elements are in particular roll-bonded parts.

In particular, a temperature-control channel structure of a temperature-control element is produced by generating a cavity by means of a pressurized fluid, in particular by means of inflation.

In one embodiment of the battery storage device, there is provision that the one or more covering elements are in each case connected by means of an adhesive material to the battery storage housing and/or to a temperature-control element.

The adhesive material preferably comprises an epoxy resin adhesive, a polyurethane adhesive and/or an acrylate adhesive.

The adhesive material is preferably arranged to produce the substance-to-substance bonded, in particular the adhesive and/or sealing, connection between a plastics material and a metallic material.

In one embodiment of the battery storage device, there is provision that the battery storage device further comprises one or more intermediate elements.

An intermediate element is preferably arranged between a temperature-control element and a bottom wall element of the battery storage housing.

It may be favorable if a temperature-control element is pressed or can be pressed by means of an intermediate element onto one or more battery modules of the battery storage device.

Preferably, the temperature-control element, by means of pressing on the latter, in particular by means of the intermediate element, can be brought into direct and/or thermal contact with one or more battery modules of the battery storage device.

An intermediate element is preferably an elastic element.

It may be favorable if an intermediate element comprises or is formed of a plastics material.

The intermediate element preferably comprises or is formed of a foam material and/or an elastomer material.

In one embodiment of the battery storage device, there is provision that
- the battery storage housing comprises or is formed of a metallic material; and/or
- the one or more temperature-control elements comprise or are formed of a metallic material; and/or
- connection stubs of the one or more temperature-control elements comprise or are formed of a metallic material; and/or
- one or more covering elements comprise or are formed of a plastics material.

The metallic material of the battery storage housing is in particular aluminum or an aluminum alloy.

It may further be favorable if the one or more temperature-control elements in each case comprise a temperature-control element basic body which comprises a metallic material.

The temperature-control element basic body consists in particular of a metallic material.

A metallic material of the temperature-control element basic body is preferably aluminum or an aluminum alloy.

The metallic material of the battery storage housing is preferably aluminum or an aluminum alloy.

Preferably, the metallic material of the battery storage housing has a greater tensile strength than the metallic material of the one or more temperature-control elements.

It may be favorable if the metallic material of the battery storage housing is stronger in tension than the metallic material of the one or more temperature-control elements.

The one or more covering elements preferably comprise a covering element basic body.

A covering element basic body of a covering element is preferably a one-piece plastics component, in particular an injection-molded plastics component.

The covering element basic body is in particular injection-molded.

A covering element, in particular a covering element basic body, preferably comprises a reinforcing structure, in particular a reinforcing rib structure.

A reinforcing structure, in particular a reinforcing rib structure, of the covering element basic body preferably comprises one or more rib elements.

The reinforcing rib structure, in particular the reinforcing rib elements, is/are preferably formed in one piece with the covering element basic body.

Rib elements of the reinforcing structure, in particular of the reinforcing rib structure, of the covering element basic body are preferably arranged parallel and/or orthogonal to one another.

It may be favorable if the reinforcing structure is arranged on a side of a covering element that faces a connection portion of a temperature-control element.

The battery storage device according to the invention is particularly suitable for use in a vehicle, in particular in a motor vehicle.

The present invention therefore further relates to a vehicle, in particular to a motor vehicle, which comprises one or more battery storage devices according to the invention.

The vehicle according to the invention preferably has individual or a plurality of the features and/or advantages described in connection with the battery storage device according to the invention.

The present invention further relates to a method for producing a battery storage device, in particular a battery storage device for a vehicle.

The present invention is based on the further object of providing a method for producing a battery storage device by means of which a battery storage device can be produced in a simple and, in particular, cost-effective manner and which allows reliable sealing.

This object is achieved according to the invention by means of a method for producing a battery storage device, in particular a battery storage device for a vehicle, having the features of the independent method claim.

The method for producing a battery storage device preferably comprises the following:

providing a battery storage housing which encloses an interior in which one or more battery modules is/are received or can be received;

providing one or more temperature-control elements through which a temperature-control medium can flow and which are intended for the temperature-control of one or more battery modules which is/are received or can be received in the interior of the battery storage housing, wherein one or more temperature-control elements are produced in particular by means of roll bonding;

arranging a temperature-control medium supply connection and a temperature-control medium discharge connection of the one or more temperature-control elements outside of the interior of the battery storage housing.

It may be favorable if the method further comprises the following: sealing the temperature-control medium supply connection and/or the temperature-control medium discharge connection by means of a covering element.

The method according to the invention for producing a battery storage device preferably has individual or a plurality of the features and/or advantages as described in connection with the battery storage device according to the invention.

Further features and/or advantages of the invention form the subject matter of the following description and of the graphic illustration of an exemplary embodiment.

Figure 1:
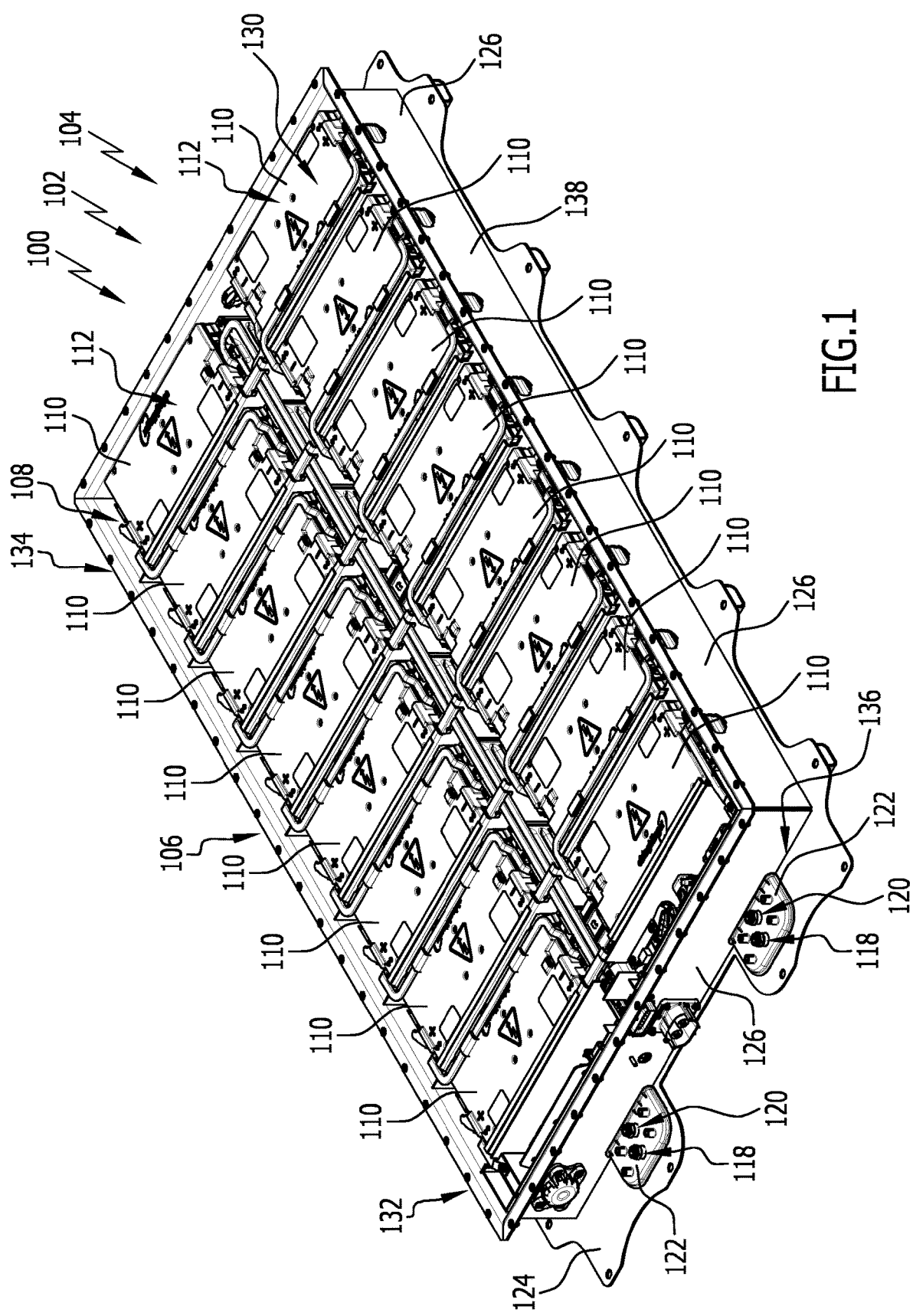
FIG. 1 shows a schematic perspective illustration of a battery storage device.

Identical or functionally equivalent elements are provided throughout the Figures with the same reference signs.

DETAILED DESCRIPTION OF THE DRAWINGS

FIGS. 1 to 15 show a battery storage device designated as a whole by 100.

The battery storage device 100 is preferably a battery storage device for a vehicle 102, in particular for a motor vehicle 104.

The battery storage device 100 preferably comprises a battery storage housing 106.

The battery storage housing 106 preferably encloses an interior 108 in which one or more battery modules 110 is/are received or can be received.

A battery module 110 of the battery storage device 100 preferably comprises one or more battery cells.

The battery storage device 100 preferably comprises two rows 112 of battery modules 110.

In particular, the battery storage device 100 comprises, in the present case, two rows 112 of eight battery modules 110 each.

The battery storage device 100 preferably further comprises one or more, in particular two, temperature-control elements 114 for the temperature-control, that is to say for the cooling and/or heating, of the battery modules 110 which are received or can be received in the interior 108 of the battery storage housing 106.

Figure 9:
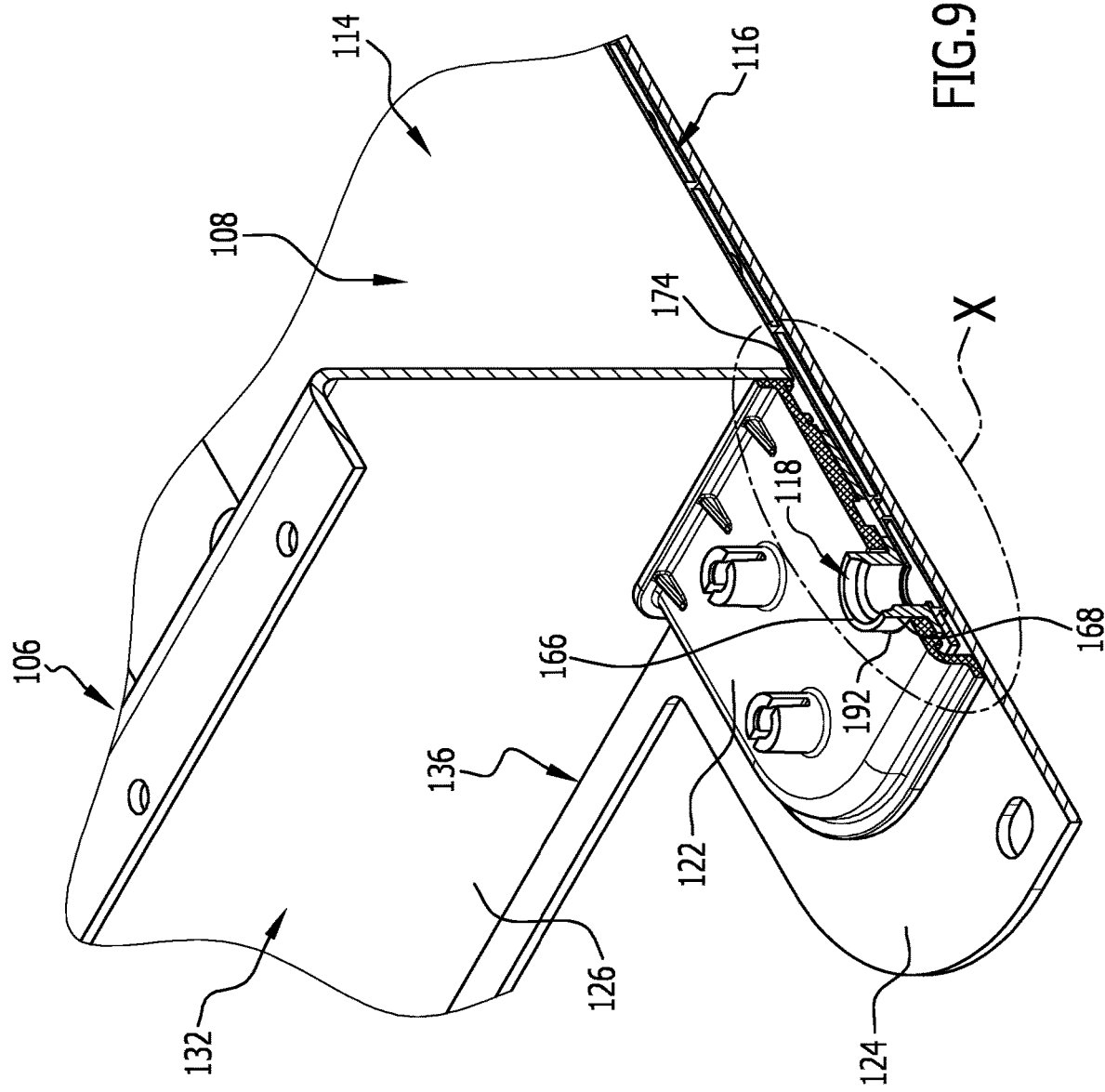
FIG. 9 shows a schematic perspective half-section of the covering element and of the connection portion of the temperature-control element from FIG. 8.
Figure 10:
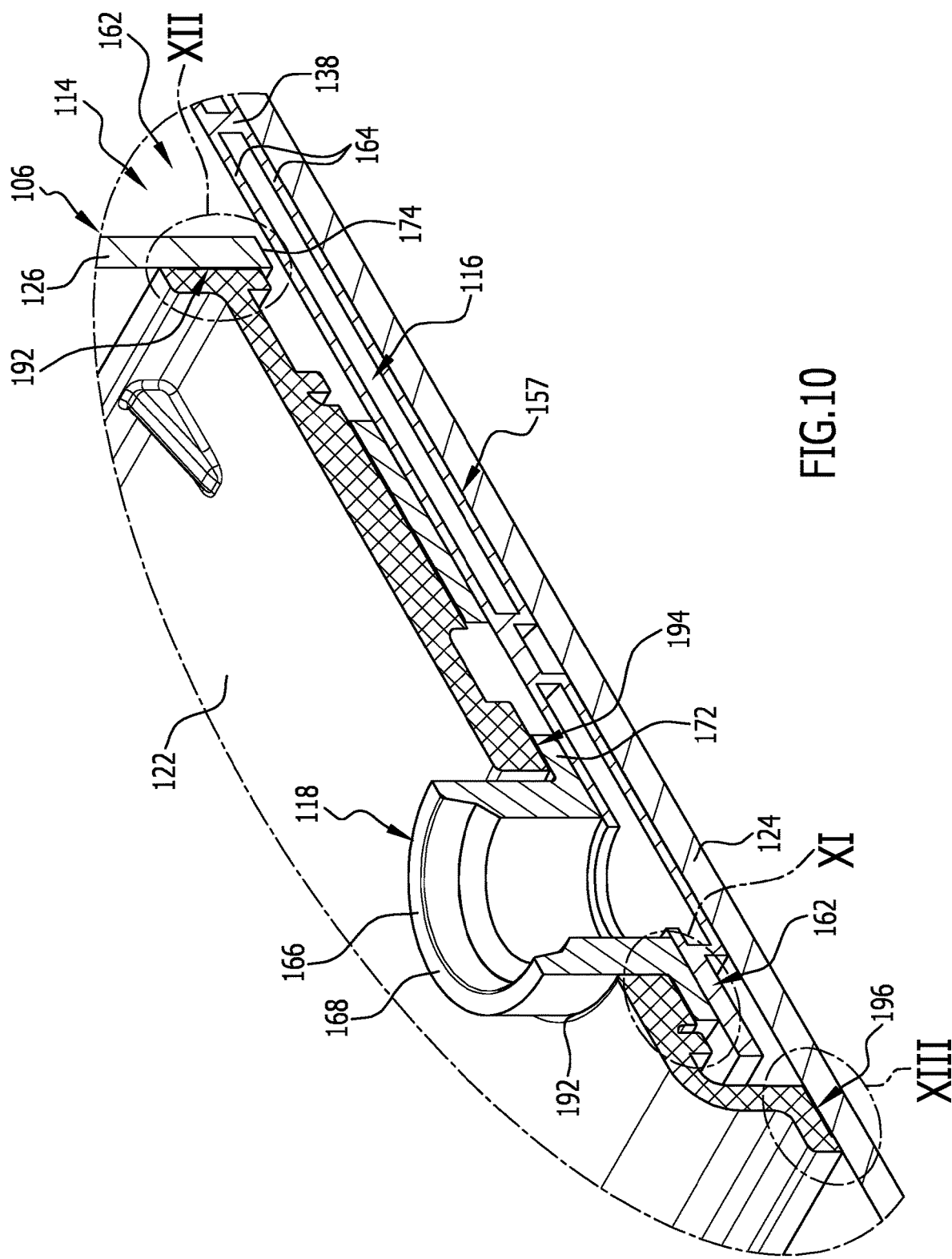
FIG. 10 shows an enlarged illustration of the region X in FIG. 9.

The temperature-control elements 114 preferably comprise a temperature-control channel structure 116 through which a temperature-control medium, in particular a temperature-control liquid, can be channeled (cf., for example, FIGS. 9 and 10).

The temperature-control liquid which can be used is, for example, water or a water-glycol mixture.

A temperature-control element 114 preferably comprises a temperature-control medium supply connection 118 and a temperature-control medium discharge connection 120.

By means of the temperature-control medium supply connection 118, the temperature-control channel structure 116 of a temperature-control element 114 can preferably be supplied with temperature-control medium.

It may further be favorable if, by means of the temperature-control medium discharge connection 120, temperature-control medium can be discharged from the temperature-control channel structure 116 of a temperature-control element 114.

Preferably, the temperature-control medium supply connection 118 and the temperature-control medium discharge connection 120 are arranged outside of the interior 108 of the battery storage housing 106.

The battery storage device 100 preferably further comprises one or more, in the present case in particular two, covering elements 122 for sealing the temperature-control medium supply connection 118 and/or the temperature-control medium discharge connection 120.

The battery storage housing 106 preferably comprises a bottom wall element 124, a plurality of, in the present case in particular four, side wall elements 126, a plurality of, in the present case in particular eight, partition wall elements 128, and a cover element 130, which is merely schematically illustrated by means of an arrow in FIG. 1.

The side wall elements 126 and the partition wall elements 128 preferably form a frame element 132.

It may be favorable if the side wall elements 126 and the bottom wall element 124 surround the interior 108 of the battery storage housing 106 on five sides.

Preferably, the bottom wall element 124 and two or more than two side wall elements 126 take the form of a one-piece bent sheet-metal part.

The interior 108 can preferably be covered by means of the cover element 130.

In particular, the interior 108 is able to be closed in a leaktight manner, in particular in an airtight and/or watertight manner, by covering the latter by means of the cover element 130.

The side wall elements 126, the bottom wall element 124 and/or the partition wall elements 128 preferably form a housing basic body 134 of the battery storage housing 106.

The housing basic body 134 is preferably formed in one piece.

In particular, it is conceivable for the side wall elements 126 to be connected by a substance-to-substance bond, in particular in a welded manner, to the bottom wall element 124, and/or to be formed as one part with the bottom wall element 124.

A weld seam, which connects the side wall elements 126 to the bottom wall element 124, is schematically marked in FIGS. 1 and 7 to 9 by means of an arrow 136.

FIGS. 1 and 5 to 9 show that the bottom wall element 124, in a main direction of extent thereof, projects away beyond the side wall elements 126 and/or beyond the frame element 132.

The bottom wall element 124 in particular projects away beyond all of the side wall elements 126 and/or the frame element 132.

The partition wall elements 128 of the frame element 132 are preferably arranged so as to be at least approximately parallel to one another.

It may be favorable if the partition wall elements 128 interconnect two side wall elements 126 situated opposite to one another in each case.

Preferably, mutually opposite side wall elements 126 are in each case arranged parallel to one another.

Mutually adjoining side wall elements 126 are preferably arranged perpendicularly to one another.

The side wall elements 126 are preferably connected to one another by a substance-to-substance bond, in particular in a welded manner, to these adjoining side wall elements 126.

Preferably, the partition wall elements 128 are each welded to mutually opposite side wall elements 126.

The battery housing 106 preferably comprises a metallic material 138, for example aluminum or an aluminum alloy.

In particular, it is conceivable for the battery storage housing 106 to be formed from the metallic material 138.

The bottom wall element 124, the side wall elements 126, the partition wall elements 128 and the cover element 130 consist in particular of the metallic material 138.

The temperature-control elements 114 preferably each comprise a connection portion 140 on which the temperature-control medium supply connection 118 and/or the temperature-control medium discharge connection 120 are/is arranged.

The connection portion 140 of the temperature-control elements 114 are preferably each arranged substantially outside of the interior 108 of the battery storage housing 106.

It may be favorable if the connection portions 106 are each covered by means of a covering element 122.

The temperature-control elements 114 are thus preferably only partially arranged within the interior 108 of the battery storage housing 106.

The temperature-control elements 114 preferably further each comprise a temperature-control portion 142 by means of which the battery modules 110 of the battery storage device 110 are able to be temperature-controlled.

It may be favorable if at least approximately 90%, preferably at least approximately 95%, of the temperature-control channel structure 116 of the temperature-control element 114 is arranged within the temperature-control portion 142.

Figure 4:
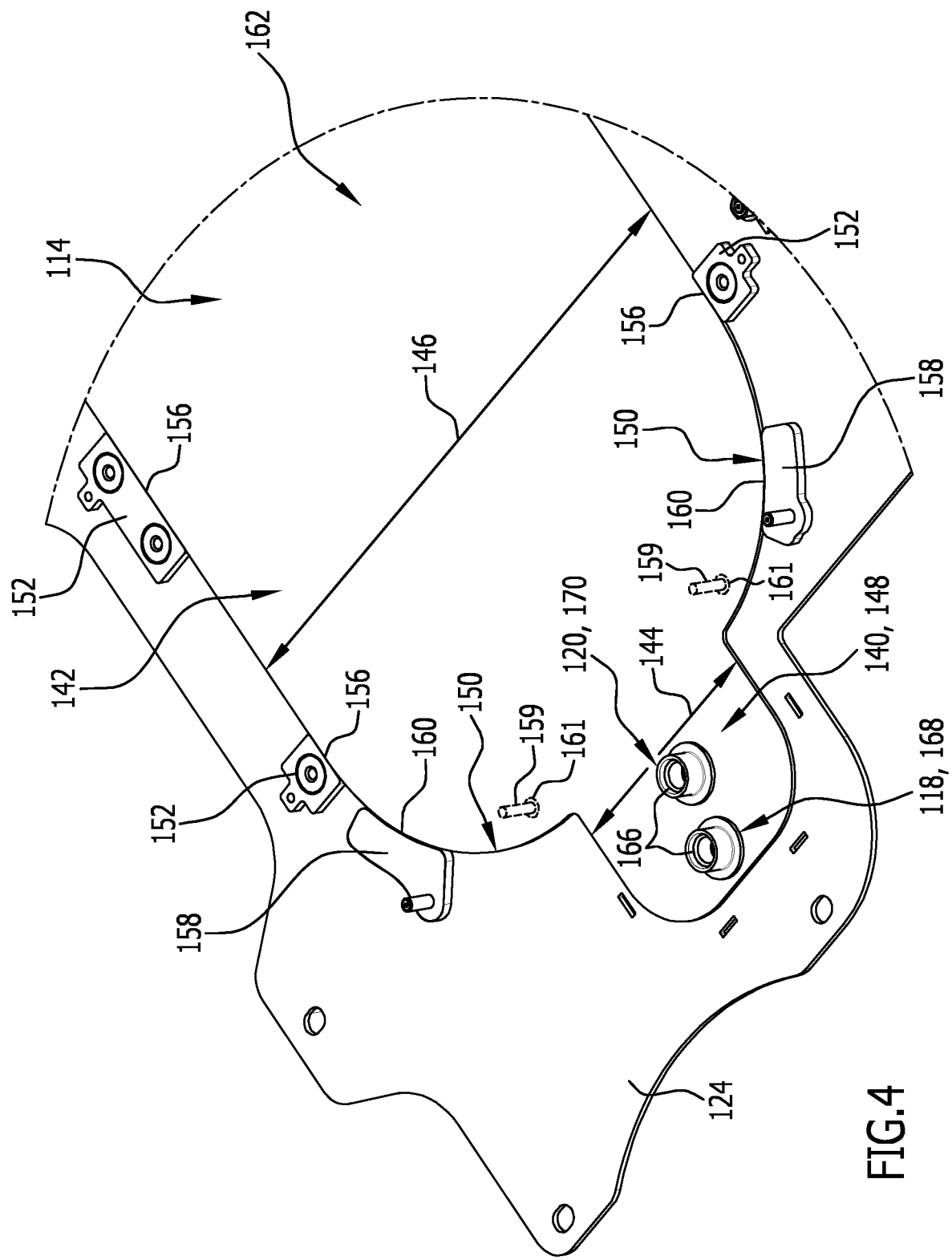
FIG. 4 shows an enlarged illustration of the region IV in FIG. 3.
Figure 5:
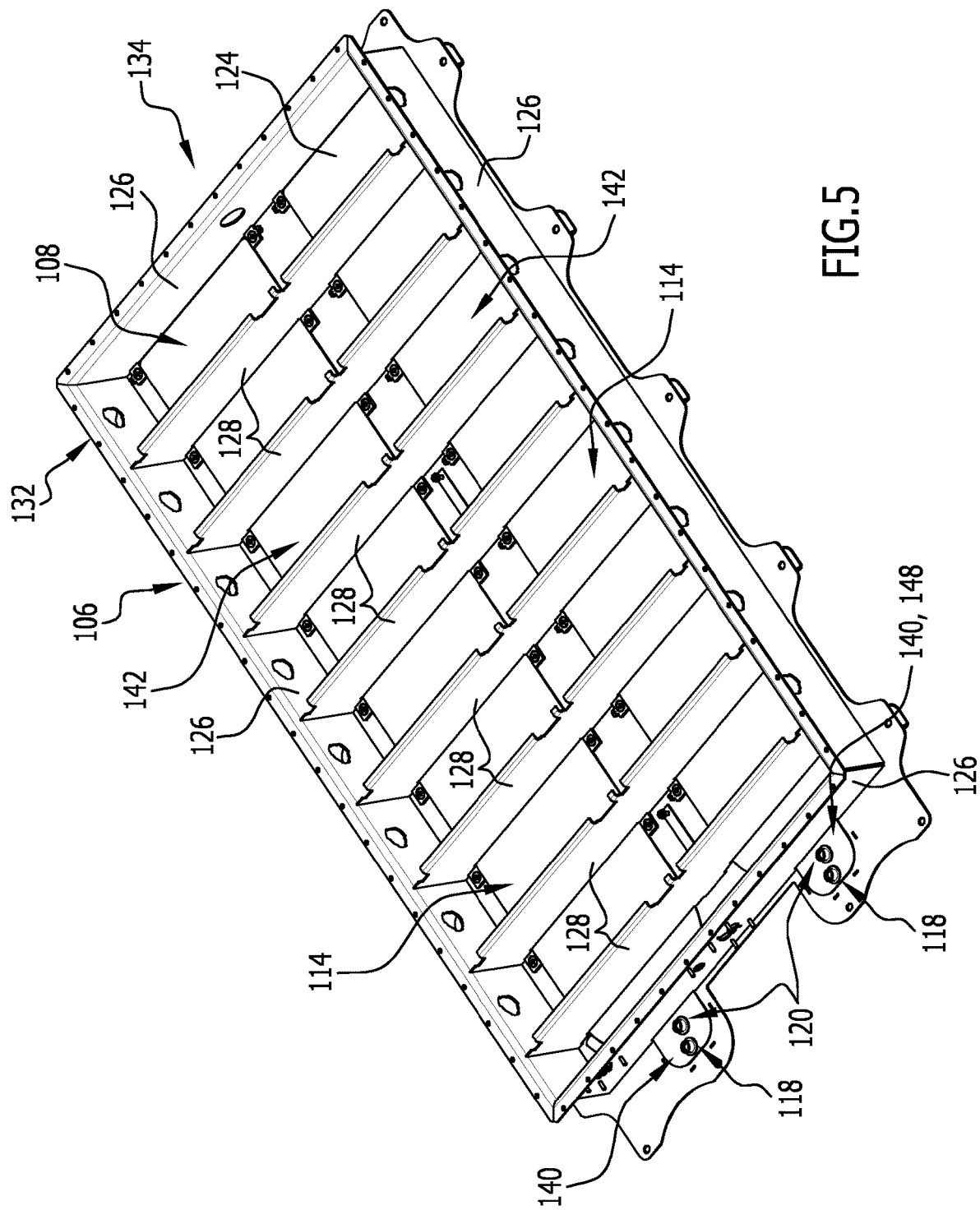
FIG. 5 shows a schematic perspective illustration of a battery storage housing of the battery storage device from FIG. 1, wherein a frame element of the battery storage housing is connected to the bottom wall element, and two temperature-control elements are arranged on the bottom wall element.
Figure 6:
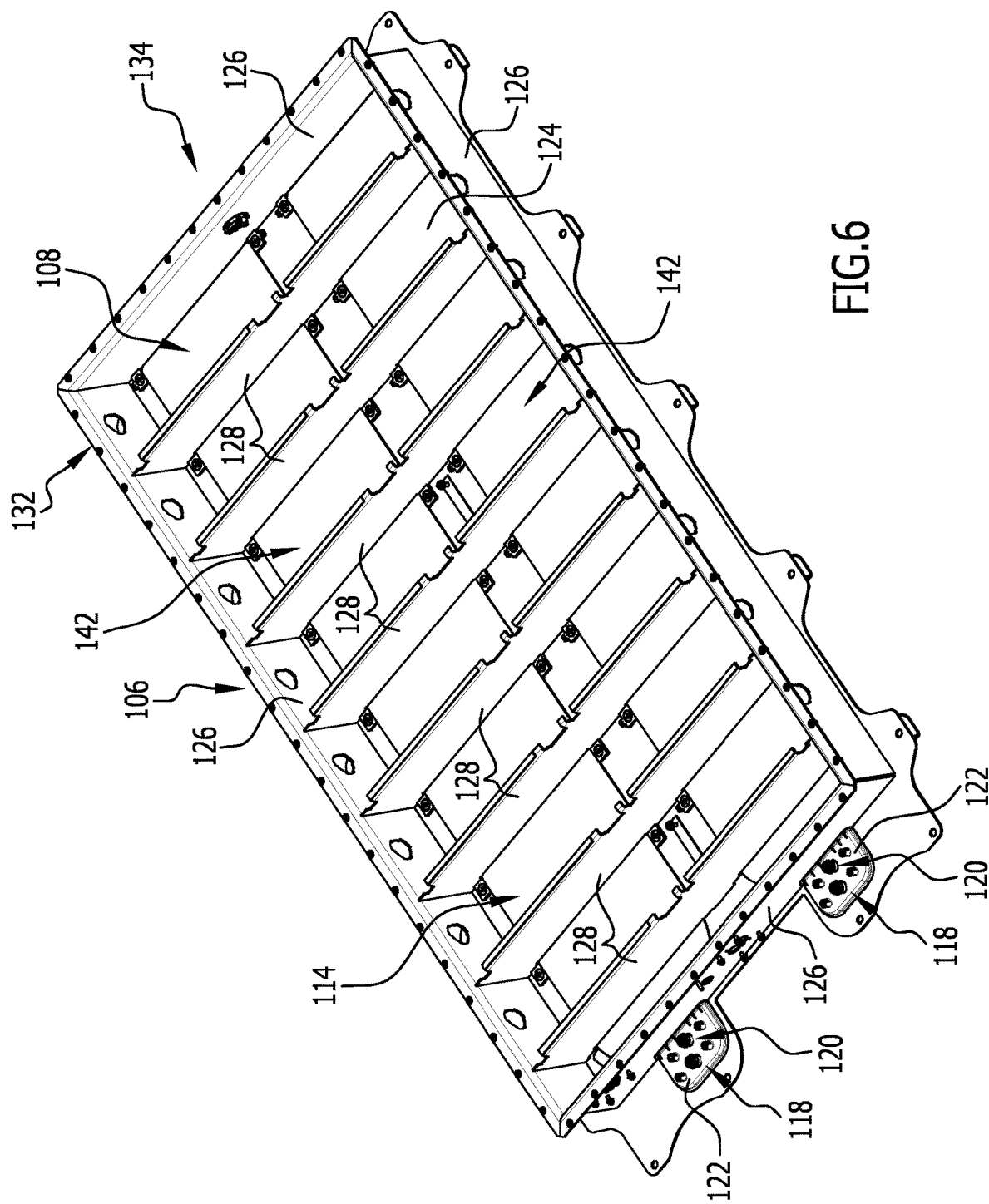
FIG. 6 shows a schematic perspective illustration of the battery storage housing from FIG. 5, wherein connection portions of the temperature-control elements are covered by means of two covering elements.

The connection portion 140 preferably has a width 144 which is less than a width 146 of the temperature-control portion 142 of the temperature-control elements 114 (cf. FIG. 4).

Preferably, a width 144 of the temperature-control element 114 is at least approximately 30%, in particular at least 40%, preferably at least approximately 50%, less than a width 146 of the temperature-control portion 142 of the temperature-control elements 114.

The temperature-control elements 114 therefore preferably comprise a tongue portion 148 which forms the connection portion 140.

The connection portion 140 and the temperature-control portion 142 of a temperature-control element 114 are preferably connected to one another by means of a transition portion 150.

Figure 3:
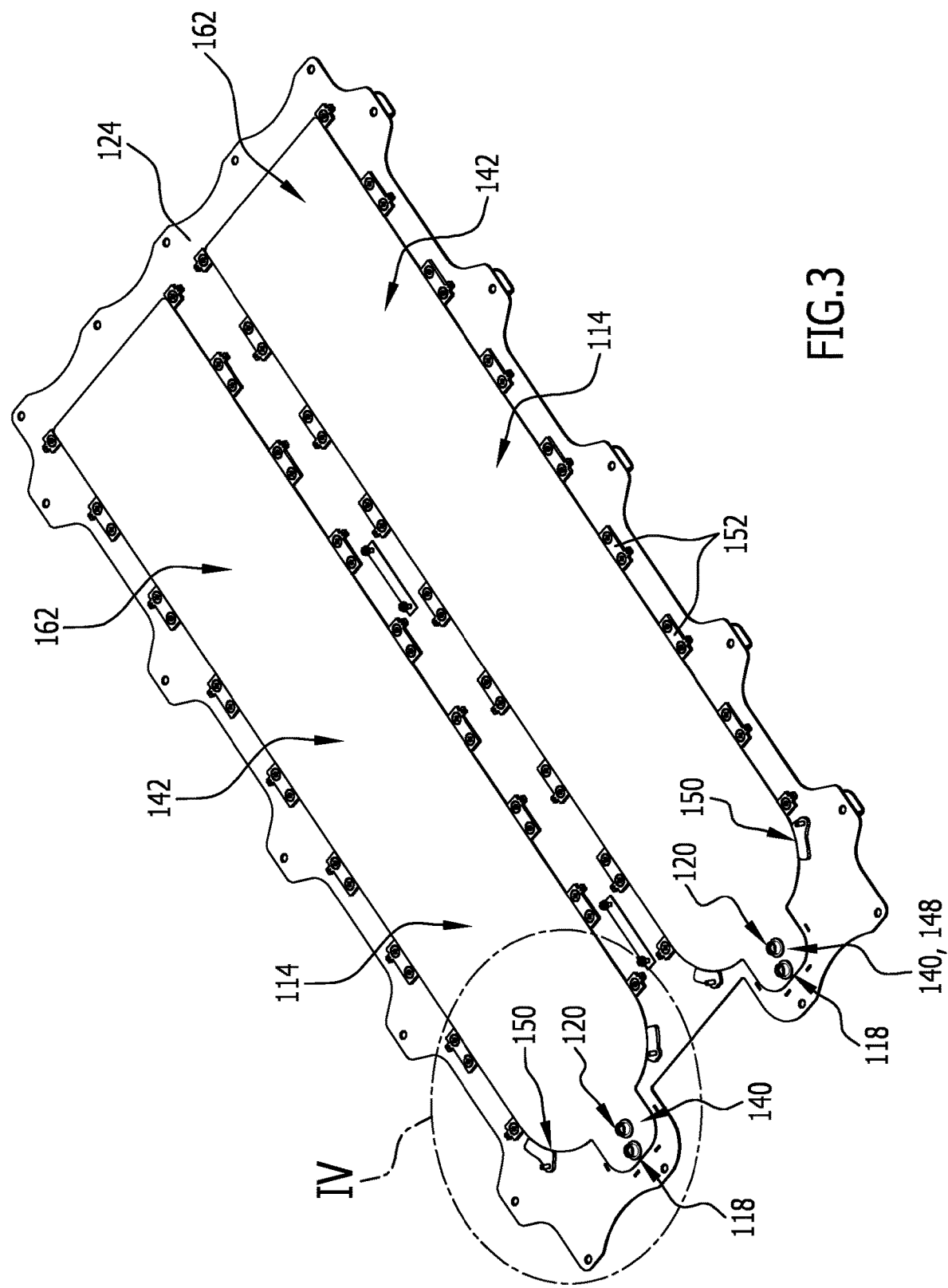
FIG. 3 shows a schematic perspective illustration of temperature-control elements of the battery storage device from FIG. 1 that are arranged on the bottom wall element from FIG. 2.

It is in the transition portion 150 that a width of the temperature-control elements 114 increases (cf. FIGS. 3 and 4).

Figure 2:
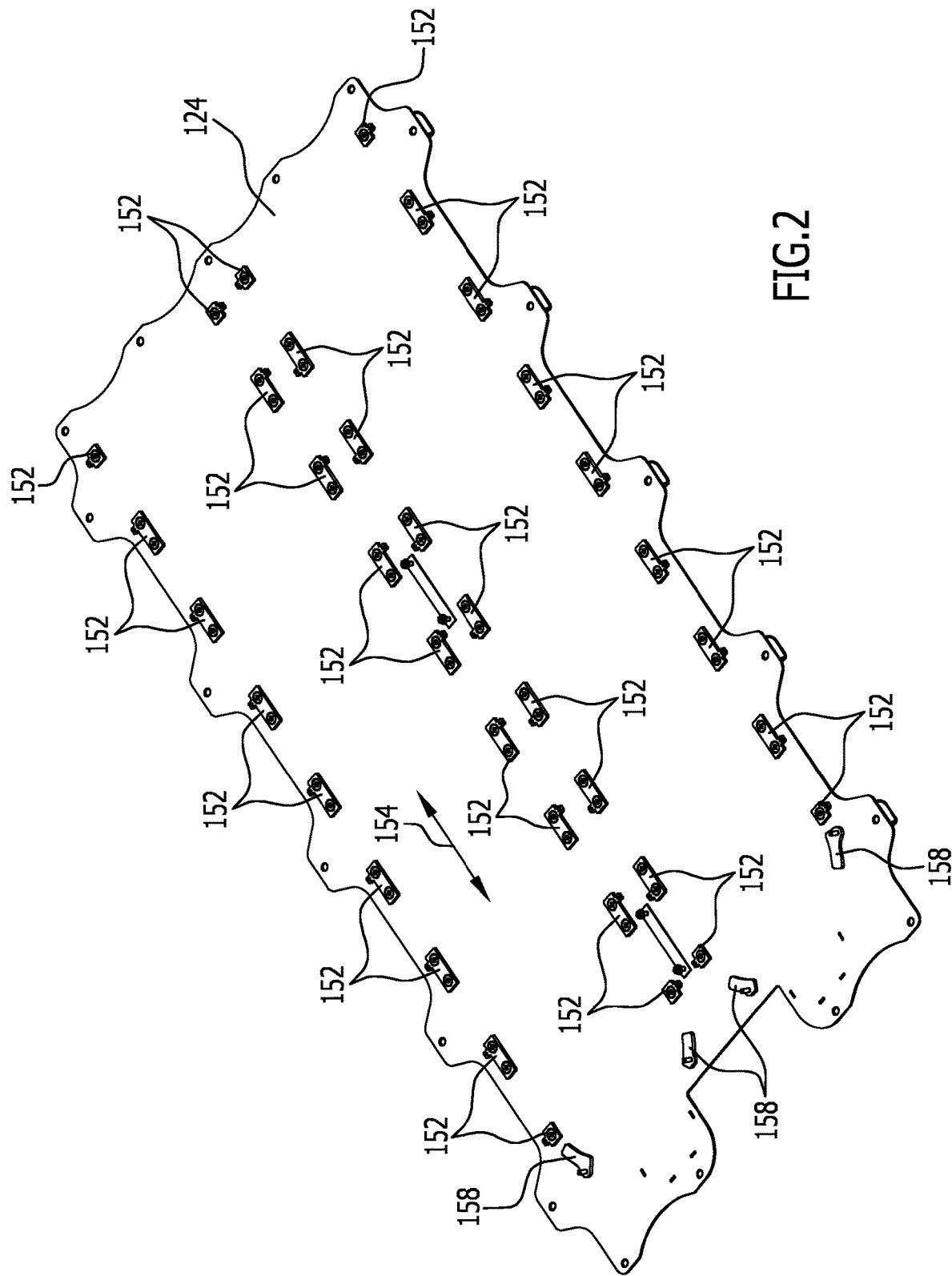
FIG. 2 shows a schematic perspective illustration of a bottom wall element of a battery storage housing of the battery storage device from FIG. 1.

Preferably, the battery storage housing 106 comprises a plurality of guide elements 152 for guiding the temperature-control elements 114 in a guiding direction 154 (cf. FIGS. 2 to 4).

For reasons of clarity, only two guide elements 152 are designated by a reference sign in FIG. 3.

The guide elements 152 preferably comprise a guide surface 156 oriented parallel to the guiding direction 154.

Here, a temperature-control element 114 is guided in the temperature-control portion 142 of the temperature-control element 114 by means of guide elements 152 which are situated opposite to one another transversely with respect to the guiding direction 154.

The guide elements 152 are here preferably arranged mirror-symmetrically to a plane of symmetry of the temperature-control elements 114.

It may be favorable if the guide elements 152 are fixed to the bottom wall element 124 of the battery storage housing 106, for example in a positively-locking and/or force-locking manner or by a substance-to-substance bond.

For example, it is conceivable for the guide elements 152 to be screwed, clipped and/or welded, to the bottom wall element 124.

Preferably, the guide elements 152 further serve to arrange the battery modules 110 in the interior 108 of the battery storage housing 106.

In particular, it is conceivable for the battery modules 110 of the battery storage device 100 to abut on guide elements 152 arranged oppositely transversely with respect to the guiding direction 154.

Here, the battery modules 110 in particular in each case abut directly on the guide elements 152.

Preferably, the battery storage device 100 further comprises one or more intermediate elements 157, which are only designated by means of an arrow in FIG. 10.

The intermediate elements 157 are preferably each arranged between a temperature-control element 114 and the bottom wall element 124 of the battery storage housing 106.

It may be favorable if a temperature-control element 114 is pressed or can be pressed by means of an intermediate element 157 onto one or more battery modules 110 of the battery storage device 100.

Preferably, the temperature-control elements 114, by pressing on the latter, in particular by means of the intermediate elements 157, are able to be brought into direct and/or thermal contact with one or more battery modules 110 of the battery storage device 110.

The intermediate elements 157 are preferably elastic elements.

It may be favorable if the intermediate elements 157 comprise or are formed of a plastics material.

The intermediate elements 157 preferably comprise or are formed of a foam material and/or an elastomer material.

The battery storage housing 106 preferably further comprises a plurality of, in the present case in particular four, stop elements 158 (cf. FIGS. 2 and 4).

By means of the stop elements 158, any displacement of the temperature-control elements 114 in the guiding direction 154 relative to the battery storage housing 106 is preferably able to be limited.

Preferably, the battery storage housing 106 comprises, for each of the temperature-control elements 114, two or more than two respective stop elements 150.

For example, it is conceivable for a temperature-control element 114 to be completely fixed to the battery storage housing 106 by means of a plurality of stop elements 158 in the guiding direction 154 that are arranged in the guiding direction 124 at end regions of the temperature-control element 114 that face away from one another, with the result that, preferably, any displacement of the temperature-control element 114 relative to that in the battery storage housing 106 in a crash situation can be prevented.

Alternatively or additionally, it is conceivable for the battery storage device 100 to comprise one or more bolt elements 159 which are fixed to the bottom wall element 124 and which are each in particular guided through a through-passage opening 161 in a temperature-control element 114.

By means of such bolt elements 159 it is possible for a temperature-control element 114 to be preferably fixed to the battery storage housing 106 in the guiding direction 154. The bolt elements 159 and/or the through-passage openings 161 are preferably arranged on the connection portion 140 and/or on the transition portion 150 of the temperature-control elements 114.

Preferably, the stop elements 158 are arranged and/or constructed to be at least approximately mirror-symmetrical, in particular at least approximately mirror-symmetrical to a plane of symmetry of a temperature-control element 114 (cf. FIG. 4).

In order to limit any displacement of a temperature-control element 114, the stop elements 158 of the battery storage housing 106 preferably bear here against the temperature-control element 114, in particular against the transition portion 150 of the temperature-control element 114.

The stop elements 158 and the temperature-control elements 114 preferably each comprise stop surfaces 160 which are constructed to be complementary to one another and by means of which the temperature-control element 114 can abut onto the stop elements 158 (cf. FIG. 4).

In a corresponding manner to the guide elements 152, the stop elements 158 are preferably likewise fixed to the bottom wall element 124 of the battery storage housing 106, in particular in a positive-locking and/or force-locking manner and/or by a substance-to-substance bond.

For example, it is conceivable for the stop elements 158 to be screwed, clipped and/or welded to the bottom wall element 124.

The temperature-control elements 114 preferably each comprise a temperature-control element basic body 162 which is constructed to be at least approximately mirror-symmetrical.

The temperature-control element basic body 162 of the temperature-control elements 114 preferably comprises two metallic components 164 which are connected to one another by a substance-to-substance bond at least in certain regions, in particular only in certain regions.

It may be favorable if the temperature-control elements 114 are produced by means of roll bonding.

The two metallic components 164 of the temperature-control element basic body 162 are preferably connected to one another by means of roll bonding.

Preferably, the temperature-control elements 114 are roll-bonded parts.

The temperature-control channel structure 116 of the temperature-control elements 114 is preferably produced by generating a cavity by means of a pressurized fluid, in particular by means of inflation.

The temperature-control element basic body 162 preferably comprises a metallic material 138.

In particular, the temperature-control element basic body 162 consists of a metallic material 138.

The metallic material 138 of the temperature-control element basic body 162 is preferably aluminum or an aluminum alloy.

Preferably, the temperature-control elements 114 each comprise a plurality of, in particular in the present case in each case two, connection stubs 166 (cf. FIGS. 3, 4 and 7 to 10).

A temperature-control element 114 preferably comprises in each case two connection stubs 166, in particular an inlet connection stub 168 and an outlet connection stub 170.

The inlet connection stub 168 preferably forms the temperature-control medium supply connection 118.

The outlet connection stub 170 preferably forms the temperature-control medium discharge connection 120.

The connection stubs 166 preferably project away from the temperature-control element basic body 162 transversely, in particular at least approximately perpendicularly, to a main plane of extent of the temperature-control elements 114.

The connection stubs 166 are preferably each connected by a substance-to-substance bond, in particular in a welded manner, to the temperature-control elements 114.

Figure 11:
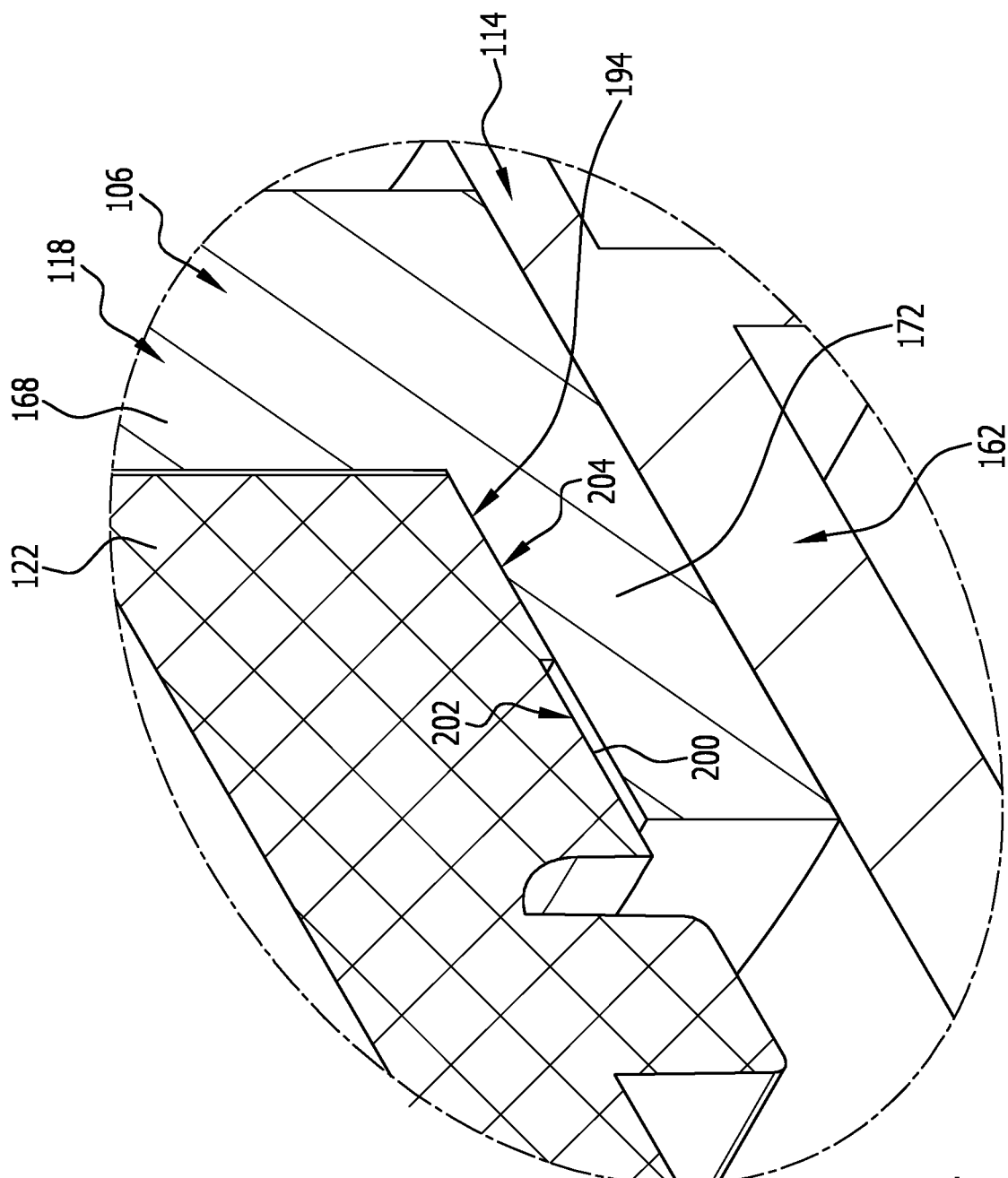
FIG. 11 shows an enlarged illustration of the region XI in FIG. 10.

Preferably, a collar portion 172 of the connection stubs 166 is connected by a substance-to-substance bond, in particular in a welded manner, to the temperature-control element basic body 162 (cf. FIGS. 10 and 11).

The temperature-control elements 114 are preferably able to be connected, by means of the connection stubs 166, to temperature-control medium supply lines and/or temperature-control medium discharge lines that are not graphically illustrated in the Figures.

Figure 7:
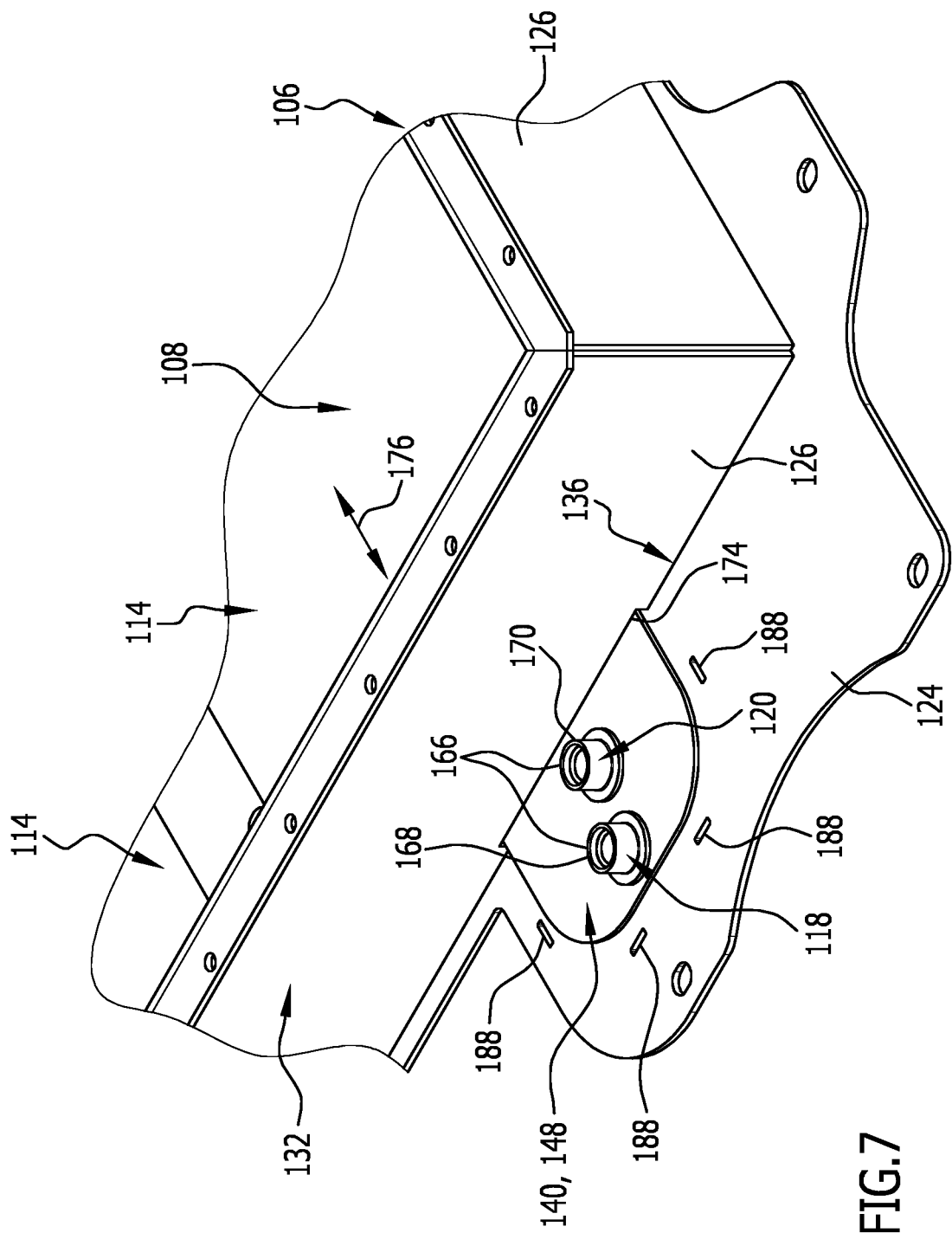
FIG. 7 shows an enlarged schematic perspective illustration of a connection portion of a temperature-control element that is guided through a through-passage opening in a side wall element of the battery storage housing of the battery storage device from FIG. 1.

A side wall element 126 of the battery storage housing 106, in particular a narrow-side side wall element 126, preferably comprises a plurality of, in the present case in particular two, through-passage openings 174, wherein the temperature-control elements 114 are each at least partially guided through a through-passage opening 174 (cf., in particular, FIGS. 7, 9 and 10).

Preferably, the temperature-control elements 114 are each guided along a through-guiding direction 176 through the through-passage openings 174 in the side wall element 126.

The through-guiding direction 176 is preferably parallel to the guiding direction 154.

Preferably, in particular the connection portions 140 of the temperature-control elements 114 are guided through the through-passage openings 174.

It may be favorable if a width of the through-passage openings 174 corresponds approximately at least to the width 144 of the temperature-control element 114 in the connection portion 140.

A width of the through-passage openings 174 is preferably at most approximately 20%, in particular at most approximately 10%, preferably at most approximately 5%, larger than a width 144 of the connection portion 140 of the temperature-control element 114.

A height of the through-passage openings 174 preferably corresponds at least to a height of a respective temperature-control element 114, in particular to a height of a temperature-control element basic body 162.

The height of the through-passage openings 174 is preferably at most approximately 20%, in particular at most approximately 10%, preferably at most approximately 5%, larger than the height of the temperature-control elements 114, in particular the height of the temperature-control element basic body 162.

The covering elements 122 preferably comprise a covering element basic body 178.

The covering element basic body 178 of the covering elements 122 is preferably in the form of one-piece plastics components 180, in particular injection-molded plastics components.

The covering elements 122, in particular the covering element basic bodies 178 of the covering elements 122, preferably comprise a reinforcing structure 182, in particular a reinforcing rib structure.

The reinforcing structure 182 preferably comprises a plurality of rib elements 184, in particular rib elements 184 which are arranged parallel to one another and/or intersect.

Figure 15:
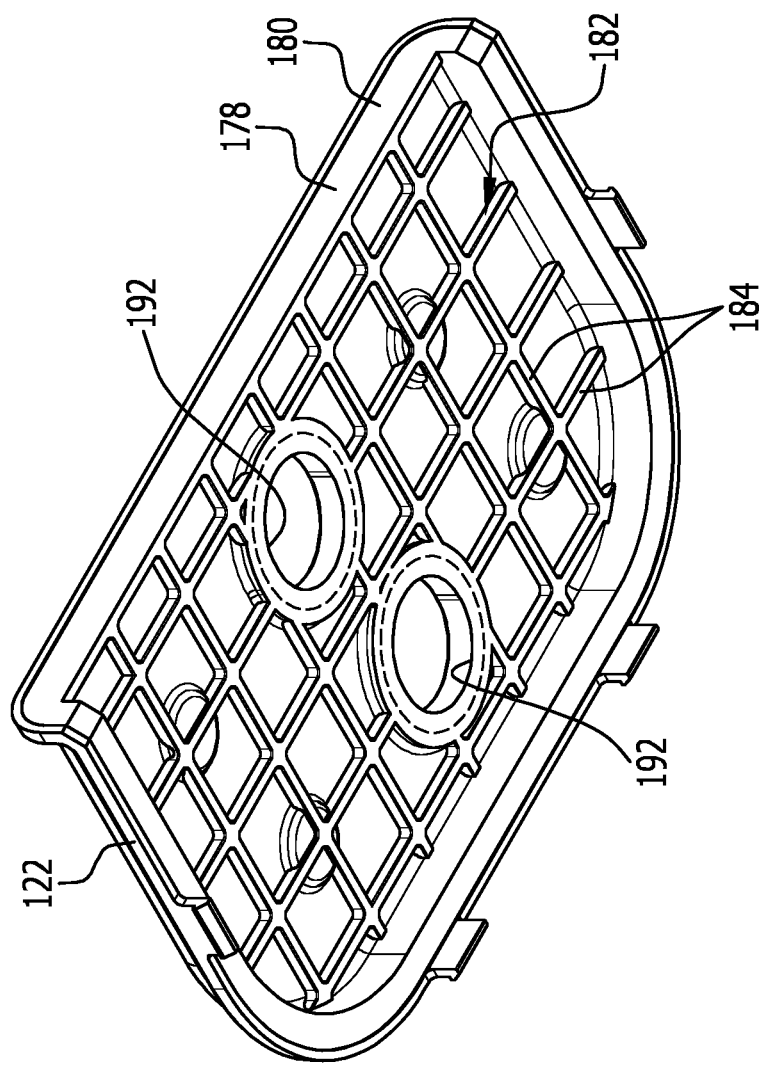
FIG. 15 shows a schematic perspective illustration of the covering element from FIG. 14 from below.

For reasons of clarity, only two rib elements 184 are designated by a reference sign in FIG. 15.

The reinforcing structure 182 is preferably formed in one piece with the covering element basic body 178.

The covering elements 122 preferably each comprise a plurality of, in the present case in particular four, latching receptacles 186 to each of which there can be fixed, in a latchable or clippable manner, a latching element which is not graphically illustrated in the Figures.

By means of a respective latching receptacle 186, it is preferably possible for a temperature-control medium supply line and/or a temperature-control medium discharge line to be fixed to a covering element 122.

In particular, it is possible for the latching receptacles 186 to have cable tie eyes in the form of latching elements fixed thereto for the purpose of fastening a temperature-control medium supply line and/or a temperature-control medium discharge line.

The battery storage device 100 preferably comprises two identical covering elements 122, wherein temperature-control medium supply lines and/or temperature-control medium discharge lines can preferably be fixed to the two covering elements 122 in a mirror-inverted manner.

The covering elements 122 preferably further comprise a marking which is not graphically illustrated in the Figures, in particular a written indication of the temperature-control medium supply connection 118 and/or of the temperature-control medium discharge connection 120.

Figure 14:
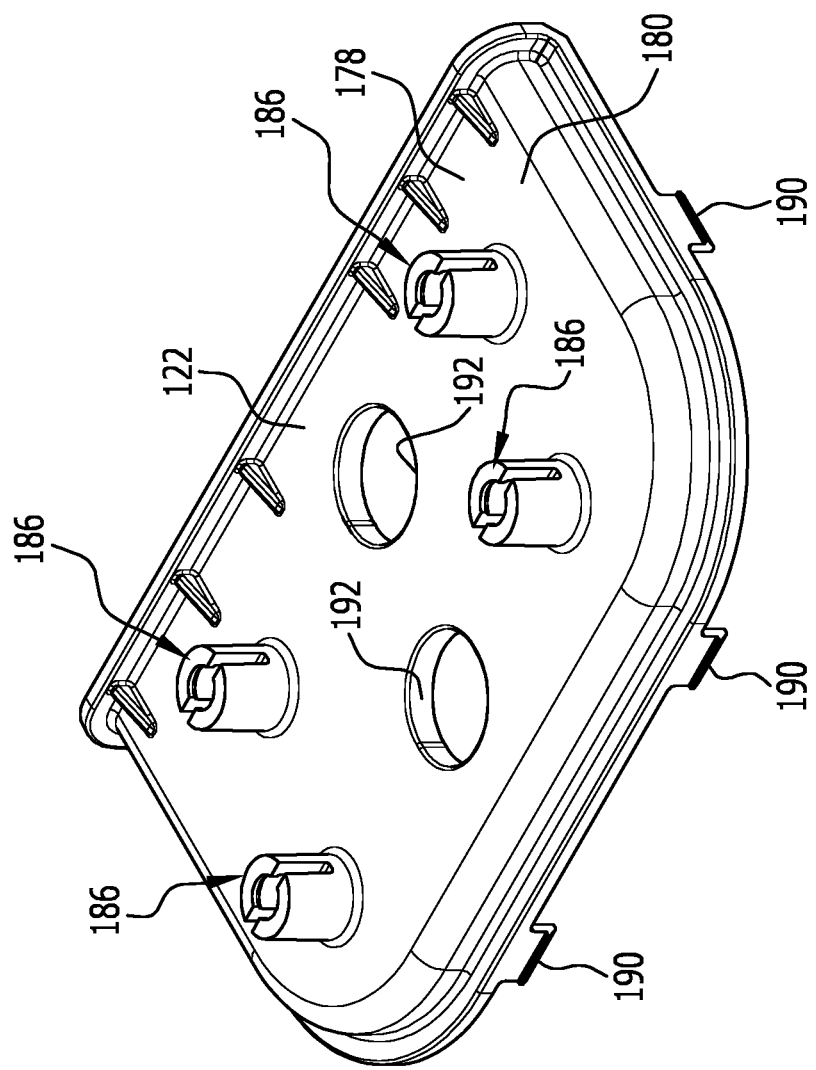
FIG. 14 shows a schematic perspective illustration of the covering element from FIG. 8 from above.

FIGS. 7 and 14 show that the covering elements 122 are each connected to the bottom wall element 124 of the battery storage housing 106 in a positively-locking and/or force-locking manner.

The bottom wall element 124 preferably comprises for this purpose a plurality of latching cutouts 188 for receiving latching projections 190 of the covering elements 122.

The latching projections 190 of the covering elements 122 are preferably received in the latching cutouts 188 of the bottom wall element 124.

Figure 8:
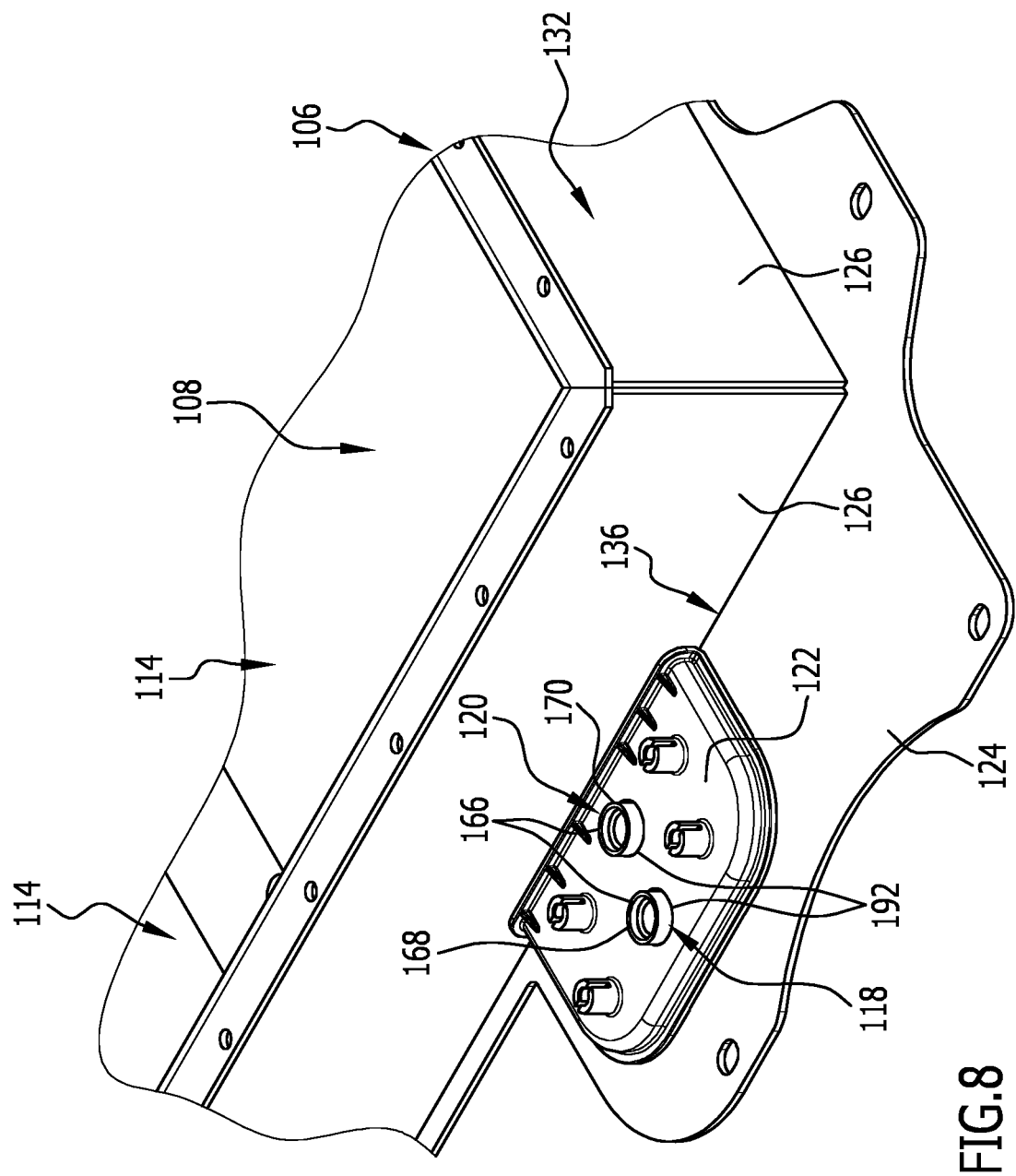
FIG. 8 shows an enlarged schematic perspective illustration of the connection portion of the temperature-control element from FIG. 7, wherein a covering element is arranged on the connection portion.

The two covering elements 122 preferably each comprise a plurality of, in the present case in particular two, through-guiding openings 192 (cf. FIGS. 14 and 15) through each of which there is guided a connection stub 166 of a temperature-control element 114 (cf. FIGS. 8 to 10).

The covering elements 122 are preferably each connected to the connection stubs 166 of the temperature-control elements 114 by a substance-to-substance bond, in particular in an adhesively bonded manner, at a plurality of, in the present case in particular two, connection sealing regions 194 (cf. FIG. 10).

Here, the covering elements 122 are preferably each connected by a substance-to-substance bond, in particular in an adhesively bonded manner, to the collar portion 172 of a connection stub 166.

The connection sealing regions 194 are preferably closed in the form of a ring.

Preferably, a though-guiding opening 192 of the covering elements 122 is surrounded by a connection sealing region 194 so as to be closed in a ring shape.

The covering elements 122 are preferably further connected to the battery storage housing 106 by a substance-to-substance bond, in particular in an adhesively bonded manner, at a housing sealing region 196.

Here, the covering elements 122 are preferably each connected by a substance-to-substance bond, in particular in an adhesively bonded manner, to the bottom wall element 124 of the battery storage housing 106 and/or to the narrow-side side wall element 126 of the battery storage housing 106.

The covering elements 122 are preferably further connected by a substance-to-substance bond to the weld seam 136 which connects the bottom wall element 124 to the narrow-side side wall element 126.

The covering elements 122 are in particular adhesively bonded to the weld seam 136.

Figure 12:
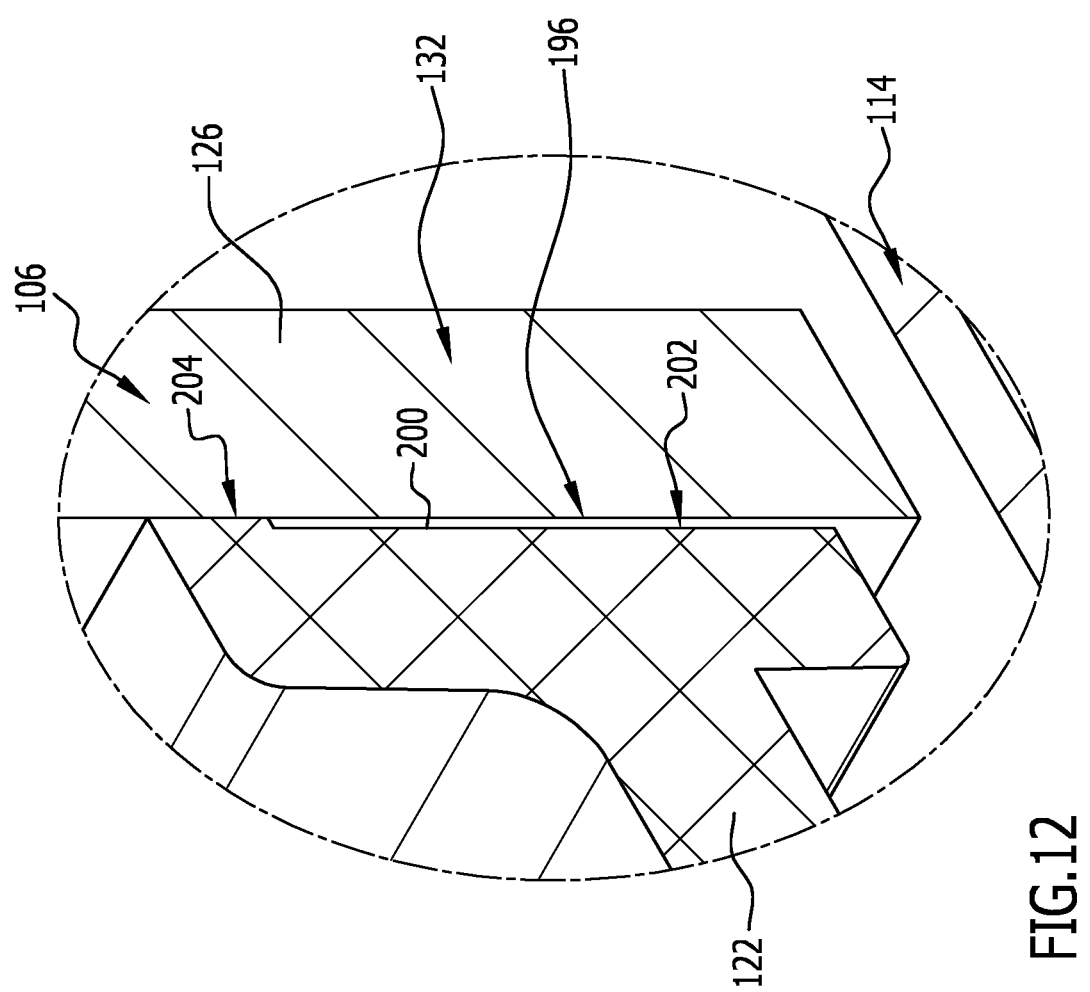
FIG. 12 shows an enlarged illustration of the region XII in FIG. 10.
Figure 13:
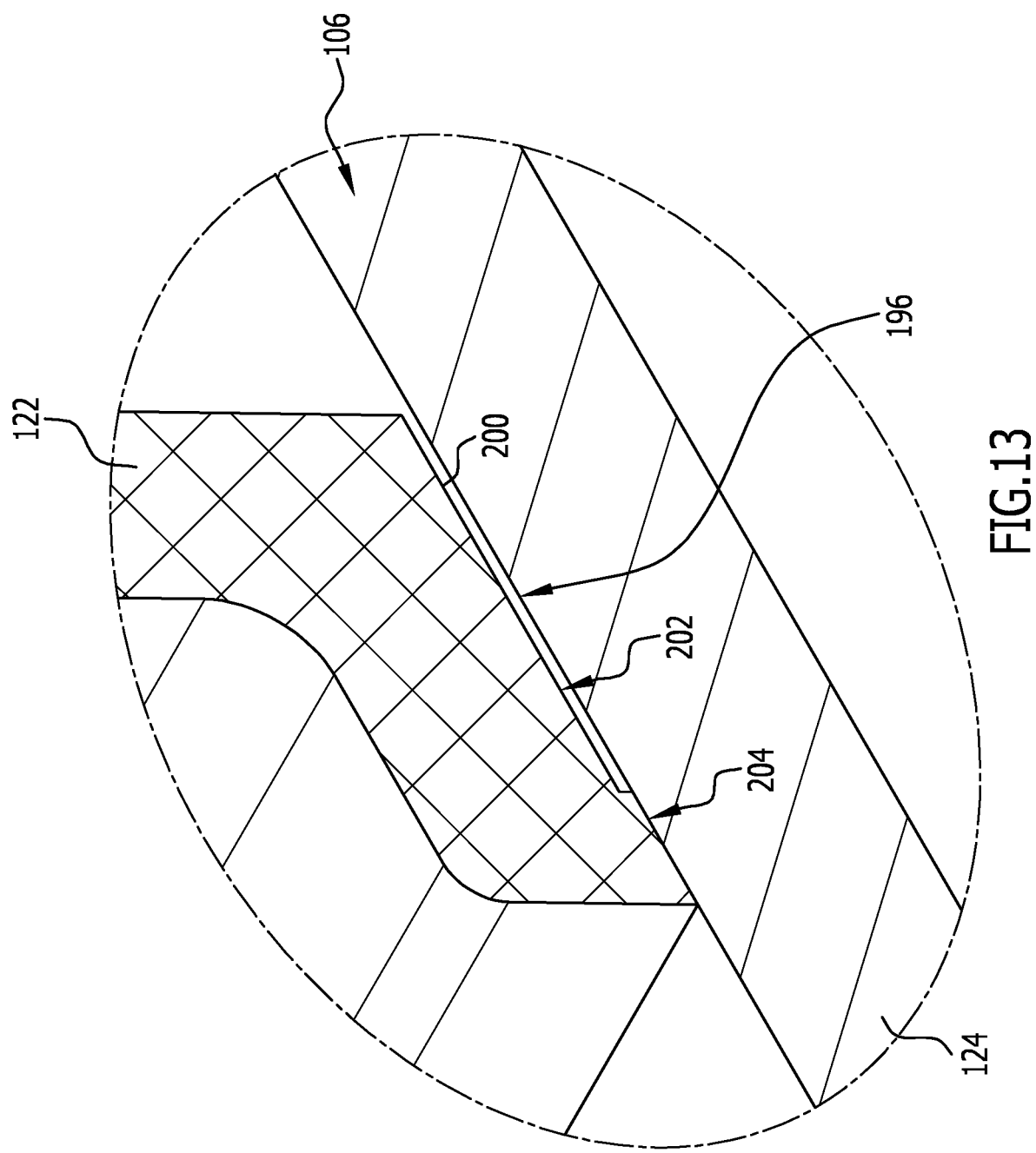
FIG. 13 shows an enlarged illustration of the region XIII in FIG. 10.

As can be gathered in particular from FIGS. 11 to 13, the covering elements 122 preferably each comprise, in the connection sealing region 194 and/or in the housing sealing region 196, an adhesive groove 200 for receiving an adhesive material which is not graphically illustrated in the Figures, but is designated by means of an arrow 202.

The covering elements 122 preferably further comprise a plurality of bearing regions 204 which bear against the battery storage housing 106 and/or against the temperature-control elements 114, in particular against the collar portions 172 of the connection stubs 166.

The adhesive grooves 200 and/or the bearing regions 204 are preferably constructed to be peripheral and/or closed in a ring shape.

The bearing regions 204 of the covering elements 122 preferably bear, in the connection sealing region 194, against the collar portions 172 of the connection stubs 166 of the temperature-control elements 114.

The bearing regions 204 of the covering elements 122 bear, in the housing sealing region 196, in particular against the bottom wall element 124 and against the narrow-side side wall element 126 of the battery storage housing 106.

It has proved to be advantageous if the adhesive groove has a width in the range from 2 to 10 mm, preferably in the range from 4 to 8 mm.

It may further be favorable if the adhesive groove has a depth in the range from 0.05 mm to 0.5 mm, for example of approximately 0.15 mm.

The adhesive material 202 preferably comprises an epoxy resin adhesive, a polyurethane adhesive and/or an acrylate adhesive.

In particular, the adhesive material 202 is arranged to produce the substance-to-substance bonded, preferably adhesive and/or sealing, connection between the plastics material of the covering elements 122 and the metallic material 138 of the battery storage housing 106 and/or of the temperature-control elements 114.

Overall, there can be provided a battery storage device 100 which can be produced in a simple and, in particular, cost-effective manner and which allows reliable sealing.

The invention claimed is:

1. A battery storage device, in particular a battery storage device for a vehicle, wherein the battery storage device comprises the following:

a battery storage housing which encloses an interior in which one or more battery modules is/are received or can be received; and one or more temperature-control elements through which a temperature-control medium can flow and which are intended for the temperature-control of one or more battery modules which is/are received or can be received in the interior of the battery storage housing, wherein the one or more temperature-control elements comprise a temperature-control medium supply connection and a temperature-control medium discharge connection which are arranged outside of the interior of the battery storage housing, wherein the battery storage device further comprises one or more covering elements for sealing the temperature-control medium supply connection and/or the temperature-control medium discharge connection of a respective temperature-control element, wherein the one or more temperature-control elements each comprise one or more, in particular in each case two, connection stubs, wherein the one or more covering elements are each connected by means of a substance-to-substance bond, in particular adhesively bonded, to one or more connection stubs at one or more connection sealing regions, and wherein the one or more temperature-control elements is/are produced in particular by means of roll bonding.

2. The battery storage device as claimed in claim 1, wherein the one or more temperature-control elements each comprise one or more, in particular in each case two, connection stubs, wherein the connection stubs project away from a basic body of the temperature-control element transversely, in particular perpendicularly, to a main plane of extent of a temperature-control element.

3. The battery storage device as claimed in claim 1, wherein the one or more temperature-control elements each comprise a connection portion on which the temperature-control medium supply connection and/or the temperature-control medium discharge connection are/is arranged, wherein the connection portion of the one or more temperature-control elements is in each case arranged outside of the interior of the battery storage housing and is in each case covered by means of a covering element.

4. The battery storage device as claimed in claim 1, wherein the one or more covering elements are each connected by means of a substance-to-substance bond, in particular adhesively bonded, to the battery storage housing at a housing sealing region.

5. The battery storage device as claimed in claim 4, wherein the one or more covering elements each comprise, in the connection sealing region and/or in the housing sealing region, an adhesive groove for receiving an adhesive material, and a bearing region which bears against the battery storage housing and/or against a temperature-control element.

6. The battery storage device as claimed in claim 1, wherein the one or more covering elements are connected in a positively-locking and/or force-locking manner to a bottom wall element of the battery storage housing.

7. The battery storage device as claimed in claim 1, wherein the battery storage housing comprises a plurality of guide elements for guiding a the temperature-control element in a guiding direction.

8. The battery storage device as claimed in claim 1, wherein a side wall element of the battery storage housing comprises one or more through-passage openings, wherein the one or more temperature-control elements are in each case at least partially guided through the one or more through-passage openings.

9. The battery storage device as claimed in claim 1, wherein the battery storage housing comprises one or more stop elements by means of which any displacement of at least one of the one or more temperature-control elements in a guiding direction relative to the battery storage housing is limited or can be limited.

10. The battery storage device as claimed in claim 1, wherein the one or more covering elements each comprise two or more than two latching receptacles on each of which there is fixed or can be fixed a latching element in a latchable or clippable manner.

11. The battery storage device as claimed in claim 1, wherein the battery storage housing comprises the following:
a bottom wall element; and/or
one or more partition wall elements; and/or
a plurality of, in particular four, side wall elements; and/or
a cover element.

12. The battery storage device as claimed in claim 1, wherein the one or more temperature-control elements each comprise a basic body which is constructed in particular so as to be mirror-symmetrical.

13. The battery storage device as claimed in claim 1, wherein the one or more covering elements are each connected to the battery storage housing and/or to at least one of the one or more temperature-control elements by means of an adhesive material.

14. The battery storage device as claimed in claim 1, wherein the battery storage device further comprises one or more intermediate elements.

15. The battery storage device as claimed in claim 1, wherein
the battery storage housing comprises or is formed of a metallic material; and/or
the one or more temperature-control elements comprise or are formed of a metallic material; and/or
the connection stubs of the one or more temperature-control elements comprise or are formed of a metallic material; and/or
the one or more covering elements comprise or are formed of a plastics material.

16. A vehicle, in particular a motor vehicle, wherein the vehicle comprises one or more battery storage devices as claimed in claim 1.

17. A method for producing a battery storage device, in particular a method for producing the battery storage device as claimed in claim 1, wherein the method comprises the following:
providing a battery storage housing which encloses an interior in which one or more battery modules is/are received or can be received;
providing one or more temperature-control elements through which a temperature-control medium can flow and which are intended for the temperature-control of one or more of the one or more battery modules which is/are received or can be received in the interior of the battery storage housing, wherein the one or more temperature-control elements each comprise one or more, in particular in each case two, connection stubs, wherein the one or more temperature-control elements are produced in particular by means of roll bonding;
arranging a temperature-control medium supply connection and a temperature-control medium discharge connection of the one or more temperature-control elements outside of the interior of the battery storage housing, and
sealing the temperature-control medium supply connection and/or the temperature-control medium discharge connection by means of a covering element,
wherein the covering element is connected by means of a substance-to-substance bond, in particular adhesive bond, to one or more connection stubs at one or more connection sealing regions.

* * * * *